(12) United States Patent
Choi

(10) Patent No.: US 8,929,223 B2
(45) Date of Patent: Jan. 6, 2015

(54) SYSTEM AND METHOD FOR CONTROLLING VOIP SERVICE

(75) Inventor: Suk Woon Choi, Paju-si (KR)

(73) Assignee: Pantech Co., Ltd., Seoul (KR)

( * ) Notice: Subject to any disclaimer, the term of this patent is extended or adjusted under 35 U.S.C. 154(b) by 852 days.

(21) Appl. No.: 13/177,761

(22) Filed: Jul. 7, 2011

(65) Prior Publication Data

US 2012/0163184 A1      Jun. 28, 2012

(30) Foreign Application Priority Data

Dec. 28, 2010   (KR) .................... 10-2010-0136900

(51) Int. Cl.
| | |
|---|---|
| H04W 4/00 | (2009.01) |
| H04L 12/28 | (2006.01) |
| H04L 29/06 | (2006.01) |
| H04W 80/04 | (2009.01) |
| H04W 8/02 | (2009.01) |

(52) U.S. Cl.
CPC .......... H04L 65/1016 (2013.01); H04W 80/04 (2013.01); H04W 8/02 (2013.01); H04L 65/1053 (2013.01); H04L 65/1069 (2013.01); H04L 65/1073 (2013.01)
USPC ........... 370/241; 370/328; 370/331; 370/338

(58) Field of Classification Search
USPC ........................................................ 370/241
See application file for complete search history.

(56) References Cited

U.S. PATENT DOCUMENTS

| | | | |
|---|---|---|---|
| 2001/0049790 A1* | 12/2001 | Faccin et al. .................. | 713/185 |
| 2003/0229699 A1* | 12/2003 | Moran et al. .................. | 709/227 |
| 2005/0025047 A1* | 2/2005 | Bodin et al. .................. | 370/229 |
| 2006/0294245 A1* | 12/2006 | Raguparan et al. ........... | 709/227 |
| 2007/0100981 A1* | 5/2007 | Adamczyk et al. ........... | 709/223 |
| 2008/0014956 A1* | 1/2008 | Balasubramanian ....... | 455/452.1 |
| 2008/0162637 A1* | 7/2008 | Adamczyk et al. ........... | 709/204 |
| 2008/0299971 A1* | 12/2008 | Cai et al. .................... | 455/435.1 |
| 2008/0305794 A1* | 12/2008 | Mukaiyama et al. ....... | 455/435.1 |
| 2009/0175239 A1* | 7/2009 | Grinshpun et al. ........... | 370/331 |
| 2009/0191841 A1* | 7/2009 | Edge et al. ................. | 455/404.1 |
| 2010/0189072 A1* | 7/2010 | Vikberg et al. ............... | 370/331 |
| 2010/0232353 A1* | 9/2010 | Hu et al. ....................... | 370/328 |
| 2010/0263026 A1* | 10/2010 | Huo et al. .......................... | 726/4 |
| 2010/0329207 A1* | 12/2010 | Balasubramanian ........ | 370/331 |
| 2012/0044867 A1* | 2/2012 | Faccin et al. .................. | 370/328 |
| 2012/0243481 A1* | 9/2012 | Watson et al. ................ | 370/328 |
| 2013/0258949 A1* | 10/2013 | Bari et al. ..................... | 370/328 |

* cited by examiner

*Primary Examiner* — Ian N Moore
*Assistant Examiner* — Jenee Williams
(74) *Attorney, Agent, or Firm* — H.C. Park & Associates, PLC

(57) ABSTRACT

In a system to control a VoIP service, a user terminal performs a first registration procedure of a CSCF through a first P-CSCF using a first mobile IP allocated from a wireless LAN, monitors a signal intensity of the wireless LAN while receiving the VoIP service over the wireless LAN, and performs a second registration procedure through a second P-CSCF using a second mobile IP allocated from a wireless packet network upon booting if the signal intensity of the wireless LAN becomes weaker than a reference value. The CSCF sends a VoIP call to the second P-CSCF if the user terminal performs the second registration procedure and the user terminal then receives an incoming VoIP call.

9 Claims, 6 Drawing Sheets

SYSTEM AND METHOD FOR CONTROLLING VOIP SERVICE

CROSS-REFERENCE TO RELATED APPLICATION

This application claims priority from and the benefit of Korean Patent Application No. 10-2010-0136900, filed on Dec. 28, 2010, which is hereby incorporated by reference for all purposes as if fully set forth herein.

BACKGROUND

1. Field

The present disclosure relates to a system and a method for controlling a Voice over Internet Protocol (VoIP) service and, more particularly, to a system and a method for controlling a VoIP service that enable a terminal having an always-on function to maintain an IP connection and to receive the VoIP service using the always-on function if the VoIP service over a wireless local area network (LAN) is lost.

2. Discussion of the Background

A wireless communication system has evolved from a system for providing only a simple voice communication service into a system for providing a high-speed data service and a voice service, including VoIP, using packets.

Recently, the current wireless communication system is being replaced with Long Term Evolution (LTE)/System Architecture Evolution (SAE) and LTE Advanced systems for providing services using a packet switching scheme.

When a terminal supporting the LTE/SAE and LTE Advanced networks for providing services using the packet switching scheme is booted up to access the network, a mobile IP is allocated to the terminal in a registration procedure. The allocated mobile IP is maintained to provide an always-on function, which may enable a user to receive a packet service according to the provided service.

In the LTE/SAE and LTE Advanced systems, a voice service is provided in a VoIP scheme using an IP Multimedia Subsystem (IMS), but is not widely used because of load and speed of the network or an expensive fee.

Recently, a VoIP service using a wireless local area network (LAN) module has been provided by including a wireless LAN module, which has a low cost and may include WiFi, WiMAX or Wireless Broadband (WiBro), in a user terminal.

However, since the wireless LAN has a shorter range, it is difficult to guarantee continuity of the VoIP service when a user moves away from an access point (AP).

Conventionally, as shown in FIG. 1, a user terminal UE1 having a wireless LAN module mounted therein accesses a first Proxy-Call Session Control Function (P-CSCF) over a wireless LAN. The user terminal UE1 then performs a registration procedure and repeatedly performs a registration refresh procedure before a session expiration time is reached. However, the user terminal UE1 does not communicate with the P-CSCF during a period between registration refresh procedures (usually, 40 to 60 seconds, not limited thereto). Since the first P-CSCF may not be aware of the state of the user terminal UE1 during this period, the first P-CSCF recognizes the user terminal UE1 to be in a call enable state.

However, if a user terminal UE1 moves beyond the coverage of a wireless LAN and access to an AP is disconnected between registration refresh procedures, the first P-CSCF does not recognize that the connection between the user terminal UE1 and the AP has disconnected until the timing arrives for performing the next registration refresh procedure.

If the connection between the user terminal UE1 and the AP is disconnected between registration refresh procedures, and a counterpart's terminal wishes to perform VoIP communication with the user terminal UE1 and sends a Session Initiation Protocol (SIP) Invite message through a third P-CSCF to try to establish VoIP call connection with the user terminal UE1 during this time, the first P-CSCF sends a response message to the SIP Invite message to the counterpart's terminal and sends the SIP Invite message to the user terminal UE1. However, since the connection between the user terminal and the AP has been disconnected, the first P-CSCF does not receive a response message to the SIP Invite message from the user terminal UE1 within an acknowledgement time. Thus, the SIP request may time out.

The first P-CSCF does not receive the response message from the user terminal UE1, and so may waste resources by retransmitting the SIP Invite message to the user terminal UE1. Once the first P-CSCF recognizes that the user terminal UE1 is in a call disable state, such as if the retransmission time has expired, the first P-CSCF sends a message indicating that the user terminal UE1 does not respond to the counterpart's terminal, terminates the call, and allows the CSCF to delete SIP registration information of the user terminal UE1.

As described above, in the related art, if the connection between the user terminal UE1 and the AP is disconnected, the first P-CSCF performs an unnecessary operation of retransmitting the SIP Invite message to the disconnected user terminal UE1. Also, the counterpart's terminal, which tries to establish VoIP call connection with the user terminal UE1, waits for a ringback tone while the SIP Invite message is retransmitted to the disconnected user terminal UE1.

As shown in FIG. 2, if VoIP communication is initiated between the user terminal UE1 connected to the first P-CSCF and the counterpart's terminal connected to the third P-CSCF over the wireless LAN, the user terminal UE1 repeatedly performs the registration refresh procedure even during VoIP communication. If the connection between the user terminal UE1 and the AP is disconnected during VoIP communication between the user terminal UE1 and the counterpart's terminal, a Real-time Transport Protocol (RTP) session between the user terminal UE1 and a media sever is disconnected, but the first P-CSCF and the third P-CSCF may not recognize that the user terminal UE1 is in a call disable state.

As a result, the counterpart's terminal maintains the VoIP call via the media server during a predetermined time even if the disconnected user terminal UE1 is in the call disable state. Thus, a delay occurs during call.

SUMMARY

Exemplary embodiments of the present invention provide a system to control a VoIP service, where the system monitors a VoIP service over a wireless local area network (LAN) while a user terminal receives the VoIP service using an IP allocated over the wireless LAN, and performs a Session Initiation Protocol (SIP) registration procedure using an IP used in the always-on function if the VoIP service over the wireless LAN is lost.

Exemplary embodiments of the present invention also provide a method for controlling a VoIP service, including monitoring a VoIP service received over a wireless LAN in a user terminal having an always-on function, and performing an SIP registration procedure using an IP used in the always-on function if the VoIP service over the wireless LAN is lost.

Additional features of the invention will be set forth in the description which follows, and in part will be apparent from the description, or may be learned by practice of the invention.

An exemplary embodiment of the present invention discloses a system to control a VoIP service, including a user terminal to receive a first mobile IP allocated by a wireless packet network and a second mobile IP allocated by a wireless local area network (LAN), the first mobile IP to be used in an always-on function, a first Proxy-Call Session Control Function (P-CSCF), through which the user terminal performs a first registration procedure in order to receive the VoIP service over the wireless LAN, a second P-CSCF, through which the user terminal performs a second registration procedure in order to receive the VoIP service over the wireless packet network, and a CSCF to control a VoIP call based on a Session Initiation Protocol (SIP). Further, the user terminal performs the first registration procedure through the first P-CSCF using the second mobile IP, monitors a signal intensity of the wireless LAN while receiving the VoIP service over the wireless LAN, and performs the second registration procedure through the second P-CSCF using the first mobile IP if the signal intensity of the wireless LAN is weaker than a first reference value. Additionally, if the user terminal performs the second registration procedure using the first mobile IP after performing the first registration procedure using the second mobile IP, the CSCF determines that a SIP session of the first mobile IP is a currently-used session and sends an incoming VoIP call for the user terminal to the second P-CSCF.

An exemplary embodiment of the present invention discloses a user terminal including a wireless packet network access module to receive a first mobile IP from a wireless packet network and to perform a first registration procedure of a Call Session Control Function (CSCF) through a first Proxy-Call Session Control Function (P-CSCF) using the first mobile IP to receive a Voice over Internet Protocol (VoIP) service over the wireless packet network, a wireless local area network (LAN) module to receive a second mobile IP from a wireless LAN and to perform a second registration procedure of the CSCF through a second P-CSCF using the second mobile IP to receive the VoIP service over the wireless LAN, a signal intensity measurement unit to measure a signal intensity of the wireless LAN, and a controller to control the wireless packet network access module to perform the first registration procedure if the signal intensity of the wireless LAN becomes weaker than a first reference value after the second registration procedure is performed.

An exemplary embodiment of the present invention discloses a method for controlling a VoIP service, including receiving a first mobile IP from a wireless local area network (LAN), receiving a second mobile IP from a wireless packet network, performing a first registration procedure of a Call Session Control Function (CSCF) through a first Proxy-Call Session Control Function (P-CSCF) using the first mobile IP, monitoring a signal intensity of the wireless LAN while receiving the VoIP service over the wireless LAN, performing a second registration procedure of the CSCF through a second P-CSCF using the second mobile IP if the signal intensity of the wireless LAN becomes weaker than a reference value, and sending a VoIP call to the second P-CSCF if an incoming VoIP call for the user terminal is received after initializing an SIP of the first mobile IP.

An exemplary embodiment of the present invention discloses a method for controlling a VoIP service, including: receiving a first mobile IP from a wireless local area network (LAN), receiving a second mobile IP from a wireless packet network, performing a first registration procedure of a CSCF through a first P-CSCF using the first mobile IP, monitoring a signal intensity of the wireless LAN and a packet loss rate while performing VoIP communication with a counterpart's terminal over the wireless LAN, performing a second registration procedure of the CSCF through a second P-CSCF using the second mobile IP if the signal intensity of the wireless LAN becomes weaker than a first reference value or the packet loss rate becomes greater than a second reference value, and establishing a first Real-time Transport Protocol (RTP) session with a media server using the second mobile IP, informing a media server that the user terminal performs the second registration procedure using the second mobile IP, and initializing a Session Initiation Protocol (SIP) of the first mobile IP, and connecting the first RTP session established by the user terminal using the second mobile IP and a second RTP session established with the counterpart's terminal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
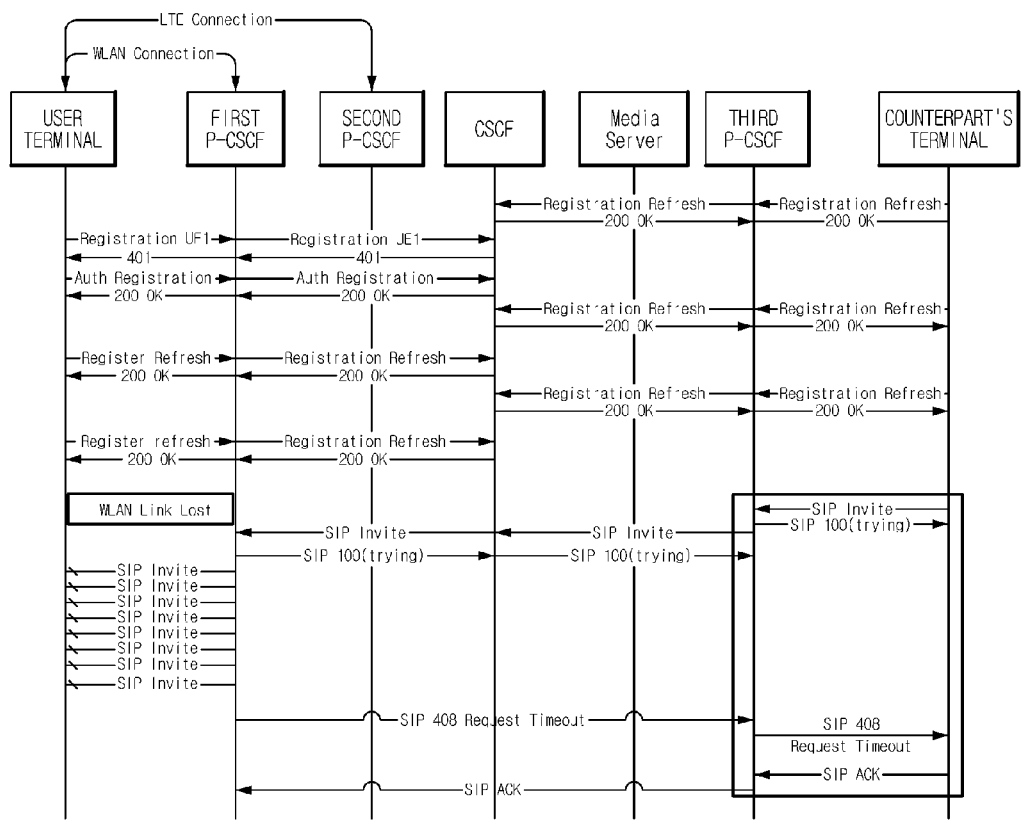
FIG. 1 and FIG. 2 are views illustrating methods for controlling a VoIP service according to the related art.
Figure 2:
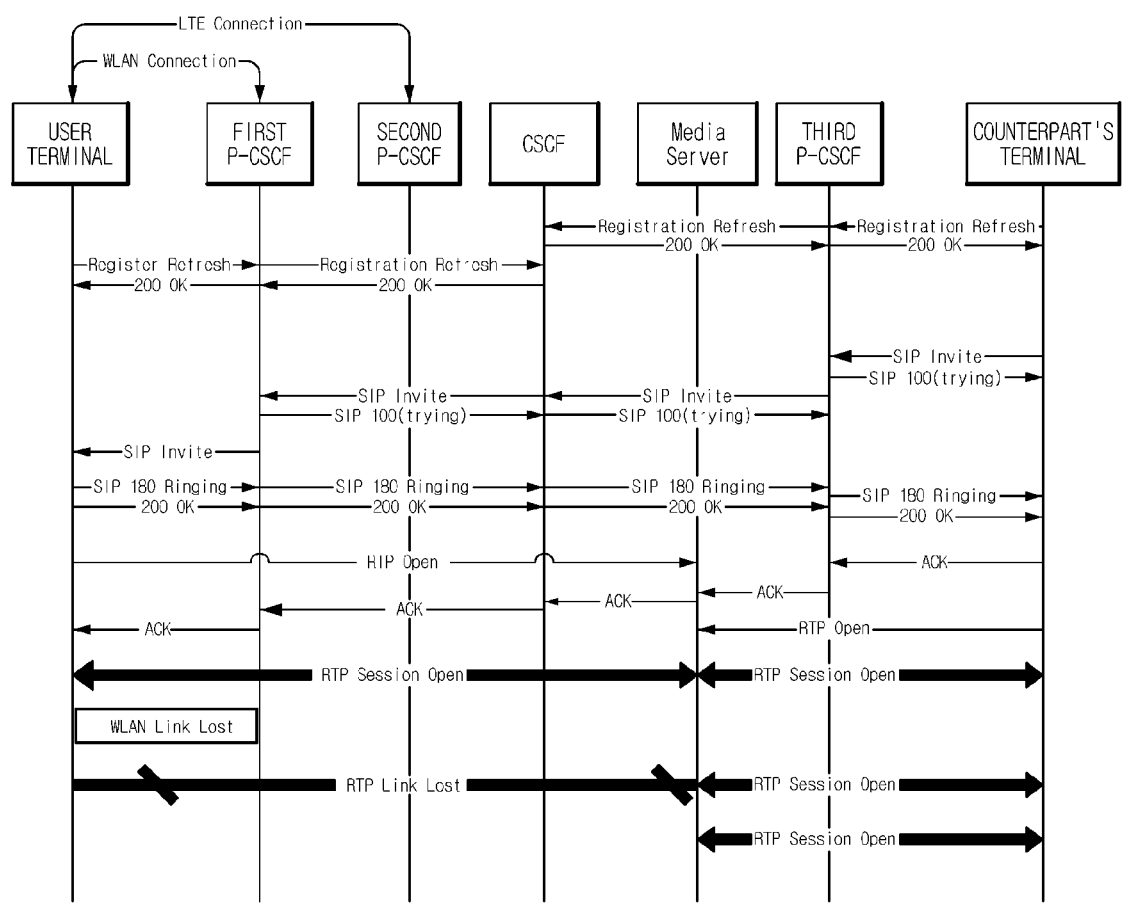

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art. In the description, details of well-known features and techniques may be omitted to avoid unnecessarily obscuring the presented embodiments.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms "first", "second", etc. does not denote any order or importance, but rather to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals denote like elements. The shape, size and regions, and the like, of the drawing may be exaggerated for clarity.

Figure 3:
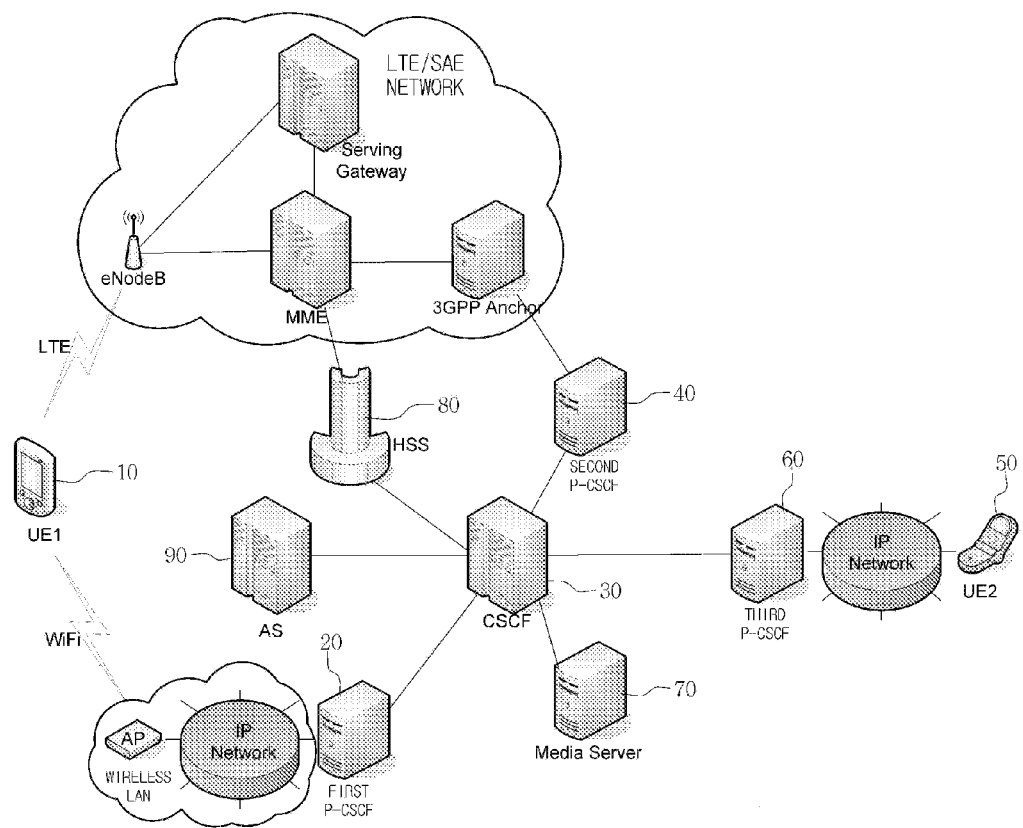
FIG. 3 is a schematic diagram showing an IP Multimedia Subsystem (IMS) based wireless communication network including a system to control a VoIP service according to an exemplary embodiment.

FIG. 3 is a schematic diagram showing an IP Multimedia Subsystem (IMS) based wireless communication network including a system to control a VoIP service according to an exemplary embodiment.

In FIG. 3, a user terminal 10 (UE1) may be a Long Term Evolution (LTE)/System Architecture Evolution (SAE) terminal having a wireless local area network (LAN) module mounted therein, which has an always-on function for accessing an LTE/SAE network connected upon booting to receive a first mobile IP, and which maintains the IP session connected to the LTE/SAE network using the allocated first mobile IP, such that a user may receive a packet service according to the service provided by the the LTE/SAE network.

However, the user terminal 10 is not limited to the LTE/SAE terminal, and could be a terminal having an always-on function to maintain an IP session and having a wireless LAN module mounted therein, for example (without limitation) a CDMA 2000 1x terminal, a WCMDA terminal, a High-Speed Downlink Packet Access (HSDPA) terminal, or an LTE Advanced terminal.

As explained, the user terminal 10 receives the first mobile IP allocated from the LTE/SAE network connected upon booting. The user terminal 10 accesses a wireless LAN according to a request of a user to receive a VoIP service over the wireless LAN, receives a second mobile IP via the wireless LAN, and performs a registration procedure of a Session Control Function (CSCF) 30 using the second mobile IP through a first Proxy-Call Session Control Function (P-CSCF) 20. The first P-CSCF 20 communicates with the wireless LAN's AP via an IP network. While the VoIP service is received using the second mobile IP over the wireless LAN, the signal intensity RSSI of the wireless LAN is monitored by the user terminal 10 in real time. If the signal intensity RSSI of the wireless LAN becomes weaker than a reference value, in order to receive the VoIP service over the LTE/SAE network, the registration procedure of the CSCF 30 is performed through a second P-CSCF 40 using the first mobile IP allocated from the LTE/SAE network.

The user terminal 10 monitors the signal intensity of the wireless LAN and may also monitor a Real-time Transport Protocol (RTP) packet loss rate in real time while VoIP communication with a counterpart's terminal 50 (UE2) is performed using the second mobile IP over the wireless LAN. If the signal intensity becomes weaker than a reference value or the RTP packet loss rate becomes greater than a reference value, the user terminal 10 performs the registration procedure of the CSCF 30 through the second P-CSCF 40 using the first mobile IP allocated from the LTE/SAE network to receive the VoIP service over the LTE/SAE network. The reference value may be a predetermined value, or may be variable according to other conditions.

The user terminal 10 may perform the registration procedure of the CSCF 30 through the second P-CSCF 40 using the first mobile IP to receive the VoIP service over the LTE/SAE network only if the signal intensity of the wireless LAN remains weaker than the reference value for a reference time.

If the signal intensity of the wireless LAN is increased again within a second reference time after performing the registration procedure of the CSCF 30 through the second P-CSCF 40 using the first mobile IP to receive the VoIP service over the LTE/SAE network, the user terminal 10 may inform the CSCF 30 that the signal intensity of the wireless LAN is increased. The second reference time The first P-CSCF 20 enables the user terminal 10 to perform the registration procedure in order to receive the VoIP service over the wireless LAN.

The second P-CSCF 40 enables the user terminal 10 to perform the registration procedure in order to receive the VoIP service over the LTE/SAE network.

A third P-CSCF 60 enables the counterpart's terminal 50 to request a VoIP call to the user terminal 10. The counterpart's terminal 50 may access the third P-CSCF 60 over the wireless LAN, the LTE/SAE network, or another wireless packet network. Further, the counterpart's terminal 50 and the user terminal 10 may be interchanged in this disclosure such that the user terminal 10 may request a VoIP call to the counterpart's terminal 50, and the counterpart's terminal 50 may have a similar structure and may perform similar operations as that disclosed for the user terminal 10 herein.

The CSCF 30 controls the VoIP call based on a Session Initiation Protocol (SIP).

If the signal intensity of the wireless LAN becomes weaker than the reference value while receiving the VoIP service over the wireless LAN, and the user terminal 10 performs the registration procedure through the second P-CSCF 40 using the first mobile IP allocated from the LTE/SAE network upon booting in order to receive the VoIP service through the LTE/SAE network, the CSCF 30 determines the SIP session of the first mobile IP as the currently-used session and sends an incoming VoIP call of the user terminal 10 to the second P-CSCF 40.

If the signal intensity of the wireless LAN becomes weaker than the reference value or the packet loss rate becomes greater than the reference value while the user terminal 10 performs VoIP communication with the counterpart's terminal 50 over the wireless LAN, and the user terminal 10 performs the registration procedure through the second P-CSCF 40 using the first mobile IP allocated from the LTE/SAE network upon booting in order to receive the VoIP service over the LTE/SAE network, the CSCF 30 initializes the SIP session of the second mobile IP used when the user terminal 10 initially performs the registration procedure through the first P-CSCF 20. Before initializing the SIP session between the user terminal 10 and the first P-CSCF 20, the user terminal 10 informs the media server 70 that the user terminal 10 performs the registration procedure through the second P-CSCF 40 using the first mobile IP allocated from the LTE/SAE network.

The media server 70 relays RTP packets between the user terminal 10 and the counterpart's terminal 50. If the media server 70 is notified that the user terminal 10 performs the registration procedure using the first mobile IP from the CSCF 30, the media server 70 connects a second RTP session established between the user terminal 10 and the media server 70 using the first mobile IP and an RTP session established between the media server and the counterpart's terminal 50. Thus, the VoIP communication between the user terminal 10 and the counterpart's terminal 50 is maintained even if the SIP session between the user terminal 10 and the first P-CSCF 20 is initialized and the first RTP session between the user terminal 10 and the media server 70 is disconnected.

If the CSCF 30 is notified that the signal intensity of the wireless LAN is increased again within a reference time after the user terminal 10 performs the registration procedure through the second P-CSCF 40 using the first mobile IP allocated from the LTE/SAE network, the CSCF 30 may initialize the SIP session of the first mobile IP, so that the user terminal 10 may receive the VoIP service over the wireless LAN.

A Home Subscriber Server (HSS) 80 performs an information management function, which includes management of a user profile and mobility management of the user terminal and an authorization function.

An application server (AS) 90 provides various IMS services.

Figure 4:
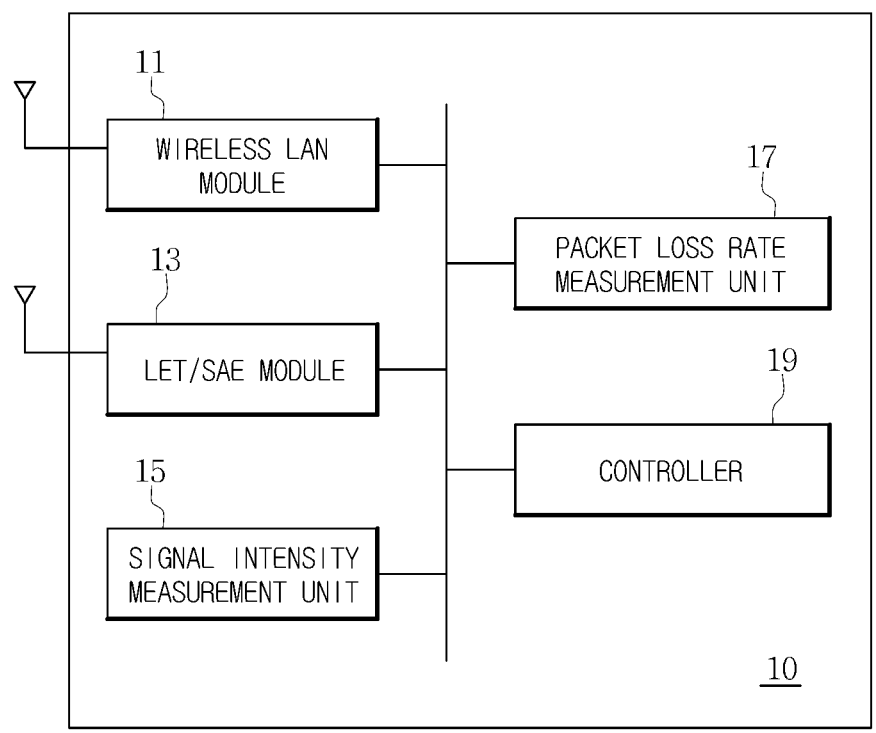
FIG. 4 is a schematic diagram showing the configuration of a user terminal according to an exemplary embodiment.

FIG. 4 is a schematic diagram showing the configuration of a user terminal according to an exemplary embodiment. An LTE/SAE terminal including a wireless LAN module will be described as an example. However, the terminal is not limited to the LTE/SAE terminal but may be a terminal having an always-on function to maintain an IP session and having a wireless LAN module mounted therein as described above, such as for example a CDMA 2000 1x terminal, a WCMDA terminal, an HSDPA terminal, and an LTE Advanced terminal.

In FIG. 4, a wireless LAN module 11 accesses the first P-CSCF 20 to perform the registration procedure to receive the VoIP service over the wireless LAN.

An LTE/SAE module 13 accesses the second P-CSCF 40 to perform the registration procedure to receive the VoIP service over the LTE/SAE network.

A signal intensity measurement unit 15 measures the signal intensity RSSI of the wireless LAN in real time and provides the measured result to the controller 19.

A packet loss rate measurement unit 17 measures the RTP packet loss rate in real time while the VoIP communication is performed, and provides the measured result to a controller 19.

The controller 19 accesses the LTE/SAE network upon booting to receive the first mobile IP, in order to provide an always-on function. The controller 19 maintains the IP session connected with the LTE/SAE network using the first mobile IP such that the user may receive a packet service according to the provided service of the LTE/SAE network.

The controller 19 accesses the wireless LAN through the wireless LAN module 11 according to a user's request to receive the VoIP service over the wireless LAN, receives the second mobile IP, performs the registration procedure through the first P-CSCF 20, and performs the registration procedure of the CSCF 30 through the second P-CSCF 40 using the first mobile IP allocated from the LTE/SAE network upon booting, if the signal intensity of the wireless LAN measured by the signal intensity measurement unit 15 becomes weaker than the reference value.

The controller 19 monitors the signal intensity of the wireless LAN and the RTP packet loss rate when the communication between the user terminal 10 and the counterpart's terminal 50 is performed over the wireless LAN, and performs the registration procedure of the CSCF 30 through the second P-CSCF 40 using the first mobile IP allocated from the LTE/SAE network upon booting in order to receive the VoIP service over the LTE/SAE network, if the signal intensity of the wireless LAN becomes weaker than the reference value or if the RTP packet loss rate becomes greater than the reference value.

If the signal intensity of the wireless LAN is instantaneously decreased due to environmental factors, such instantaneous decrease may not significantly influence the VoIP service. Accordingly, the controller 19 may perform the registration procedure of the CSCF 30 through the second P-CSCF 40 using the first mobile IP allocated from the LTE/SAE network upon booting only if the signal intensity of the wireless LAN remains weaker than the reference value for at least the reference time. The reference value and reference time may be predetermined, or may depend upon other conditions such as network conditions or environmental conditions.

If the signal intensity of the wireless LAN is increased again within another reference time after performing the registration procedure of the CSCF 30 through the second P-CSCF 40 using the first mobile IP, the controller 19 informs the CSCF 30 that the signal intensity of the wireless LAN is increased again in order to continuously receive the VoIP service over the wireless LAN. Then, the CSCF 30 may initialize the SIP session of the first mobile IP such that the service terminal 10 may continuously receive the VoIP service over the wireless LAN.

Figure 5:
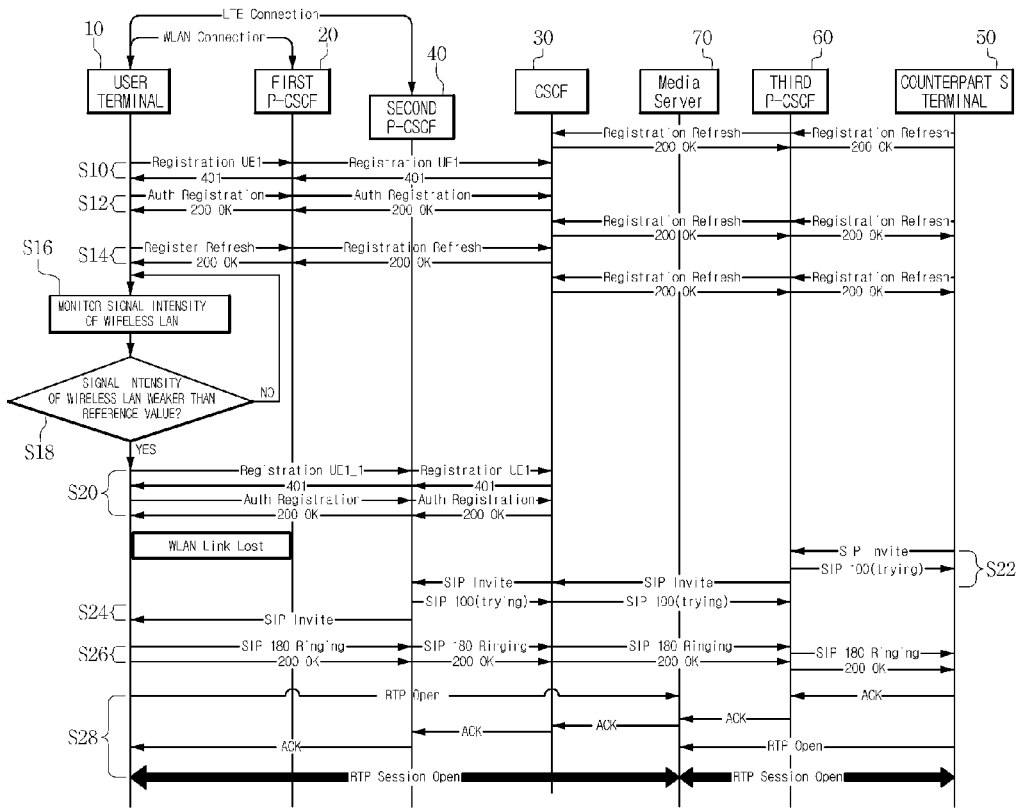
FIG. 5 is a view illustrating a method for controlling a VoIP service according to an exemplary embodiment.

FIG. 5 is a view illustrating a method for controlling a VoIP service according to an exemplary embodiment.

First, the user terminal 10, which receives the first mobile IP from the LTE/SAE network upon booting, accesses the wireless LAN according to the user's request to receive the VoIP service over the wireless LAN, receives the second mobile IP, and performs the registration procedure of the CSCF 30 through the first P-CSCF 20 (S10).

The user terminal 10 performs an authentication registration procedure (S12), and repeatedly performs the registration refresh procedure before the session expiration time included in the response message (200 OK), which is received as a response to the authentication registration from the CSCF 30, expires (S14).

As described, the registration refresh procedure is performed repeatedly. If the period of the registration refresh procedure is short, battery consumption is increased. In general, a VoIP service provider sets the period of the registration refresh procedure to 40 to 60 seconds. The user terminal 10 and the first P-CSCF 20 may not perform any communication between consecutive registration refresh procedures.

As described above, since the first P-CSCF 20 is not aware of the state of the user terminal 10 in the period between consecutive registration refresh procedures, the user terminal 10 monitors the signal intensity of the wireless LAN in real time (S16) while the user terminal 10 repeatedly performs the registration refresh procedure, and determines whether the signal intensity of the wireless LAN becomes weaker than the reference value (S18).

If the signal intensity of the wireless LAN becomes weaker than the reference value as the determination result in operation S18, the user terminal 10 performs the registration procedure of the CSCF 30 through the second P-CSCF 40 using the first mobile IP allocated from the LTE/SAE network upon booting, in order to receive the VoIP service over the LTE/SAE network (S20).

The signal intensity of the wireless LAN may be weaker than the reference value for a shorter time due to environmental factors, or may remain weaker than the reference value. Accordingly, the user terminal 10 may perform the registration procedure of the CSCF 30 through the second P-CSCF 40 using the first mobile IP in operation S20 only if the signal intensity of the wireless LAN remains weaker than the reference value for a first reference time.

If the signal intensity of the wireless LAN increases again within a second reference time, the user terminal 10 informs the CSCF 30 that the signal intensity of the wireless LAN is increased again, in order to continuously receive the VoIP service over the wireless LAN.

The user terminal 10, after performing the registration procedure of the CSCF 30 through the second P-CSCF 40 using the first mobile IP in order to receive the VoIP service over the LTE/SAE network, may perform a deregistration procedure (not shown) in order to terminate the SIP session between the user terminal 10 and the first P-CSCF 20 over the wireless LAN.

If the user terminal 10 performs the registration procedure of the CSCF 30 through the second P-CSCF 40 using the first mobile IP allocated from the LTE/SAE network in operation S20, the CSCF 30 has two different mobile IPs for the one user terminal 10. Thus, the CSCF 30 determines the SIP session of the first mobile IP as the currently-used session, and initializes the SIP session of the second mobile IP used when the user terminal 10 accesses the wireless LAN.

If the user terminal 10, which performs the registration procedure through the second P-CSCF 40 using the first mobile IP allocated from the LTE/SAE network in operation S20, informs the CSCF 30 that the signal intensity of the wireless LAN is increased again, the CSCF 30 may initialize the SIP session of the first mobile IP such that the user terminal 10 may continuously receive the VoIP service over the wireless LAN.

If the counterpart's terminal 50 transmits the SIP Invite message for requesting a VoIP call through the third P-CSCF 60 to the CSCF 30 after the user terminal 10 performs the registration procedure through the second P-CSCF 40 in operation S20, the CSCF 30 sends the SIP Invite message received from the counterpart's terminal 50 to the second P-CSCF 40 used when the user terminal 10 performs the registration procedure using the first mobile IP (S22).

The second P-CSCF 40, which receives the SIP Invite message in operation S22, sends the response message to the SIP Invite message to the third P-CSCF 60 connected to the counterpart's terminal 50 through the CSCF 30 and transmits the SIP Invite message to the user terminal 10 (S24).

The user terminal 10, which receives the SIP Invite message from the second P-CSCF 40 in operation S24, transmits the response message to the SIP Invite message to the counterpart's terminal 50 through the second P-CSCF 40 (S26).

Thereafter, the user terminal 10 and the counterpart's terminal 50 establish the RTP sessions with the media server 70 for relaying the RTP packets to perform VoIP communication (S28).

Figure 6:
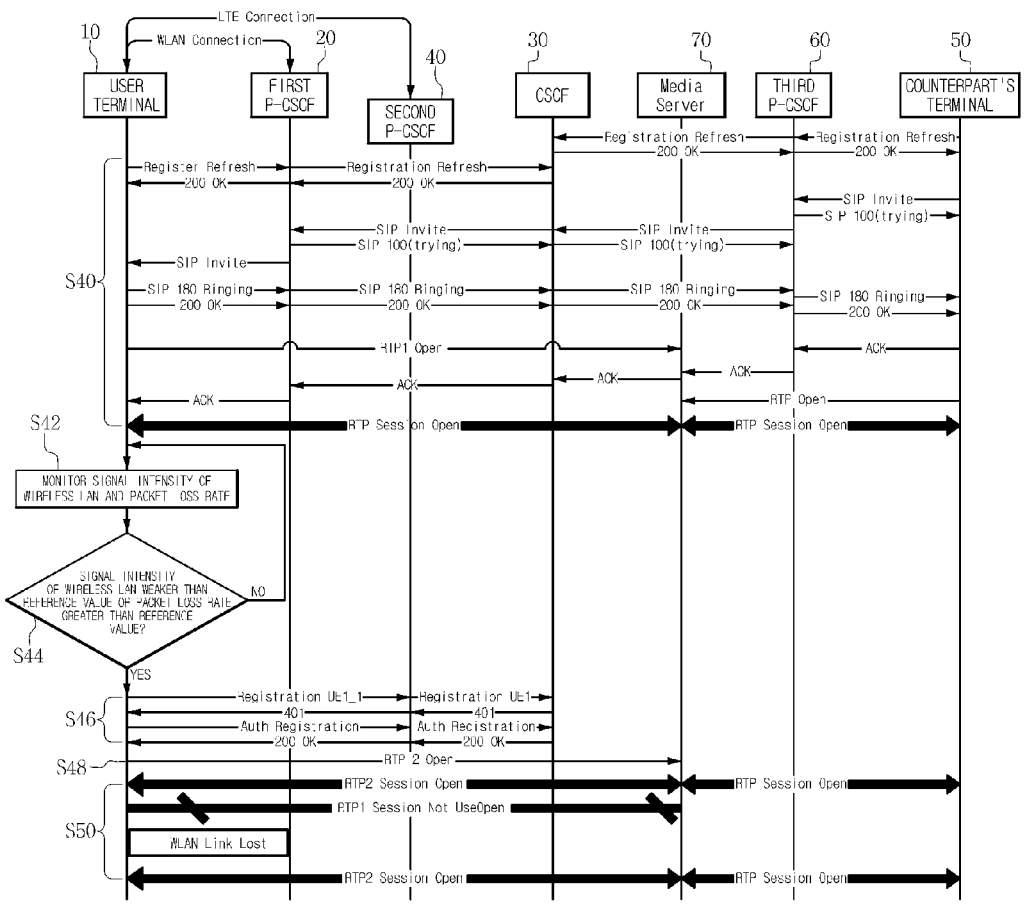
FIG. 6 is a view illustrating a method for controlling a VoIP service according to an exemplary embodiment.

FIG. 6 is a view illustrating a method for controlling a VoIP service according to an exemplary embodiment. Though not shown in FIG. 6, the user terminal 10 is allocated with a first mobile IP from the LTE/SAE network upon booting.

Referring to FIG. 6, first, VoIP communication is initiated between the user terminal 10 and the counterpart's terminal 50. The user terminal 10 repeatedly performs the registration refresh procedure through the first P-CSCF 20 connected over the wireless LAN. The counterpart's terminal 50 repeatedly performs the registration refresh procedure through the third P-CSCF 60 (collectively, S40). The user terminal 10 connected to the wireless LAN monitors the signal intensity of the wireless LAN and the packet loss rate in real time (S42), and determines whether the signal intensity becomes weaker than the reference value or whether the packet loss rate becomes greater than the reference value (S44).

If it is determined that the signal intensity becomes weaker than the reference value or the packet loss rate becomes greater than the reference value in operation S44, the user terminal 10 performs the registration procedure of the CSCF 30 through the second P-CSCF 40 using the first mobile IP allocated from the LTE/SAE network upon booting in order to receive VoIP service over the LTE/SAE network (S46).

Thereafter, the user terminal 10, which performs the registration procedure of the CSCF 30 through the second P-CSCF 40 using the first mobile IP in operation S46, establishes a second RTP session (RTP2) with the media server 70 using the first mobile IP in order to maintain the VoIP communication with the counterpart's terminal 50 over the LTE/SAE network (S48).

If the user terminal 10 performs the registration procedure of the CSCF 30 through the second P-CSCF 40 using the first mobile IP in operation S46, the CSCF 30 has two different mobile IPs for the one user terminal 10. Thus, the CSCF 30 determines the SIP session of the first mobile IP used when the user terminal 10 subsequently performs the registration procedure as a currently-used session, and initializes the SIP session of the second mobile IP, which is allocated from the wireless LAN to the user terminal 10.

Before initializing the SIP session between the user terminal 10 and the first P-CSCF 20, the CSCF 30 informs the media server 70 that the user terminal 10 performs the registration procedure through the second P-CSCF 40 using the first mobile IP.

As described above, the media server 70, which is informed that the user terminal 10 performs the registration procedure through the second P-CSCF 40 using the first mobile IP from the CSCF 30, connects the second RTP session established between the user terminal 10 and the media server 70 using the first mobile IP in operation S48 with the RTP session established between the media server 70 and the counterpart's terminal 50 (S50).

If the second RTP session established between the user terminal 10 and the media server 70 using the first mobile IP and the RTP session established with the counterpart's terminal 50 are connected in operation S50, the CSCF 30 initializes the SIP session between the user terminal 10 and the first P-CSCF 20 such that the VoIP communication between the user terminal 10 and the counterpart's terminal 50 is maintained even if the first RTP session between the user terminal 10 and the media server 70 is disconnected.

Various modifications may be made to the exemplary embodiments without departing from the scope of the present disclosure. For example, although the VoIP service is described in the above-described embodiments, the present disclosure is applicable to other services based on SIP, such as a Short Message Service (SMS) and an Instant Messaging (IM) service.

According to the exemplary embodiments, the registration procedure of the CSCF is performed using an IP used in an always-on function such that the user terminal may receive the VoIP service if the user terminal is disconnected from the wireless LAN.

While the exemplary embodiments have been shown and described, it will be understood by those skilled in the art that various changes in form and details may be made thereto without departing from the spirit and scope of the present disclosure as defined by the appended claims and their equivalents.

In addition, many modifications can be made to adapt a particular situation or material to the teachings of the present disclosure without departing from the essential scope thereof. Therefore, it is intended that the present disclosure not be limited to the particular exemplary embodiments disclosed for carrying out the present disclosure, but that the present disclosure will include all embodiments falling within the scope of the appended claims and their equivalents.

What is claimed is:

1. A system to control a Voice over Internet Protocol (VoIP) service, comprising:
   a user terminal to receive a first mobile IP allocated by a wireless packet network and a second mobile IP allocated by a wireless local area network (LAN), the first mobile IP to be used in an always-on function;
   a first Proxy-Call Session Control Function (P-CSCF), through which the user terminal performs a first registration procedure in order to receive the VoIP service over the wireless LAN;
   a second P-CSCF, through which the user terminal performs a second registration procedure in order to receive the VoIP service over the wireless packet network; and
   a CSCF to control a VoIP call based on a Session Initiation Protocol (SIP),
   wherein the user terminal performs the first registration procedure through the first P-CSCF using the second mobile IP, monitors a signal intensity of the wireless LAN while receiving the VoIP service over the wireless LAN, and performs the second registration procedure through the second P-CSCF using the first mobile IP if the signal intensity of the wireless LAN is weaker than a first reference value, and
   wherein if the user terminal performs the second registration procedure using the first mobile IP after performing the first registration procedure using the second mobile IP, the CSCF determines that a SIP session of the first mobile IP is a currently-used session and sends an incoming VoIP call for the user terminal to the second P-CSCF.

2. The system according to claim 1, wherein the user terminal monitors both the signal intensity of the wireless LAN and a packet loss rate if the user terminal performs VoIP communication with a counterpart's terminal over the wireless LAN, and performs the second registration procedure through the second P-CSCF using the first mobile IP if the signal intensity of the wireless LAN becomes weaker than the first reference value or the packet loss rate becomes greater than a second reference value while performing VoIP communication with the counterpart's terminal,
   the CSCF informs a media server relaying packets between the user terminal and the counterpart's terminal that the user terminal performs the second registration procedure through the second P-CSCF using the first mobile IP, and
   the media server connects a first Real-time Transport Protocol (RTP) session established with the user terminal using the first mobile IP and a second RTP session established with the counterpart's terminal to perform VoIP communication between the user terminal and the counterpart's terminal.

3. The system according to claim 1, wherein if the signal intensity of the wireless LAN increases within a reference time after the second registration procedure, the CSCF initializes the SIP session of the first mobile IP for subsequent performance of a third registration procedure such that the user terminal continuously receives the VoIP service over the wireless LAN.

4. A user terminal, comprising:
   a wireless packet network access module to receive a first mobile IP from a wireless packet network and to perform a first registration procedure of a Call Session Control Function (CSCF) through a first Proxy-Call Session Control Function (P-CSCF) using the first mobile IP to receive a Voice over Internet Protocol (VoIP) service over the wireless packet network;
   a wireless local area network (LAN) module to receive a second mobile IP from a wireless LAN and to perform a second registration procedure of the CSCF through a second P-CSCF using the second mobile IP to receive the VoIP service over the wireless LAN;
   a signal intensity measurement unit to measure a signal intensity of the wireless LAN; and
   a controller to control the wireless packet network access module to perform the first registration procedure if the signal intensity of the wireless LAN becomes weaker than a first reference value after the second registration procedure is performed.

5. The user terminal according to claim 4, further comprising:
   a packet loss rate measurement unit to measure a packet loss rate while the user terminal performs VoIP communication,
   wherein the controller monitors the signal intensity of the wireless LAN and the packet loss rate while performing the VoIP communication using the wireless LAN module, and performs the first registration procedure of the CSCF through the first P-CSCF using the first mobile IP if the signal intensity of the wireless LAN becomes weaker than the first reference value or the packet loss rate becomes greater than a second reference value.

6. The user terminal according to claim 4, wherein the controller performs the first registration procedure through the first P-CSCF using the first mobile IP if the signal intensity of the wireless LAN remains weaker than the first reference value for a reference time.

7. The user terminal according to claim 4, wherein if the signal intensity of the wireless LAN increases above the first reference value within a reference time after the first registration procedure is performed, the controller informs the CSCF that the signal intensity of the wireless LAN is increased.

8. A method for controlling a Voice over Internet Protocol (VoIP) service, comprising:
   receiving a first mobile IP from a wireless local area network (LAN);
   receiving a second mobile IP from a wireless packet network;
   performing a first registration procedure of a Call Session Control Function (CSCF) through a first Proxy-Call Session Control Function (P-CSCF) using the first mobile IP;
   monitoring a signal intensity of the wireless LAN while receiving the VoIP service over the wireless LAN;
   performing a second registration procedure of the CSCF through a second P-CSCF using the second mobile IP if the signal intensity of the wireless LAN becomes weaker than a reference value; and
   sending a VoIP call to the second P-CSCF if an incoming VoIP call for the user terminal is received after initializing a Session Initiation Protocol (SIP) of the first mobile IP.

9. A method for controlling a Voice over Internet Protocol (VoIP) service, comprising:
   receiving a first mobile IP from a wireless local area network (LAN);

receiving a second mobile IP from a wireless packet network;
performing a first registration procedure of a Call Session Control Function (CSCF) through a first Proxy-Call Session Control Function (P-CSCF) using the first mobile IP;
monitoring a signal intensity of the wireless LAN and a packet loss rate while performing VoIP communication with a counterpart's terminal over the wireless LAN;
performing a second registration procedure of the CSCF through a second P-CSCF using the second mobile IP if the signal intensity of the wireless LAN becomes weaker than a first reference value or the packet loss rate becomes greater than a second reference value, and establishing a first Real-time Transport Protocol (RTP) session with a media server using the second mobile IP;
informing a media server that the user terminal performs the second registration procedure using the second mobile IP, and initializing a Session Initiation Protocol (SIP) of the first mobile IP; and
connecting the first RTP session established by the user terminal using the second mobile IP and a second RTP session established with the counterpart's terminal.

* * * * *